Jan. 10, 1939.  W. H. KITTO  2,143,018
SUCTION CLEANER
Filed Dec. 2, 1936  6 Sheets-Sheet 1

INVENTOR
William H. Kitto
BY
Harry S. Dumars
ATTORNEY

Jan. 10, 1939.  W. H. KITTO  2,143,018
SUCTION CLEANER
Filed Dec. 2, 1936  6 Sheets-Sheet 2

INVENTOR
William H. Kitto
BY
Harry J. Dumarse
ATTORNEY

Jan. 10, 1939.  W. H. KITTO  2,143,018
SUCTION CLEANER
Filed Dec. 2, 1936   6 Sheets-Sheet 3

INVENTOR
William H. Kitto
BY
Harry S. Demaree
ATTORNEY

Jan. 10, 1939.  W. H. KITTO  2,143,018
SUCTION CLEANER
Filed Dec. 2, 1936  6 Sheets-Sheet 4
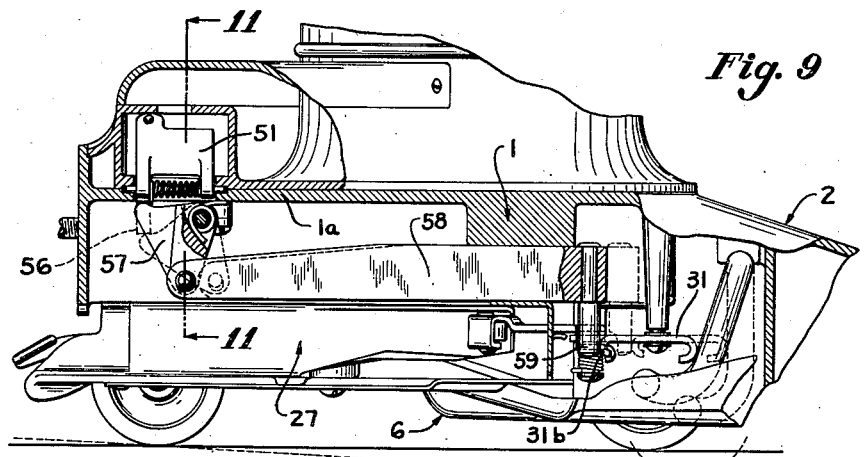
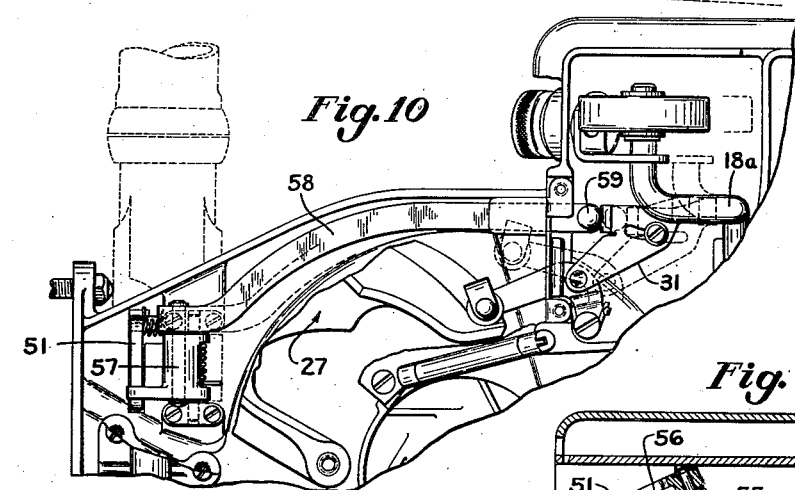
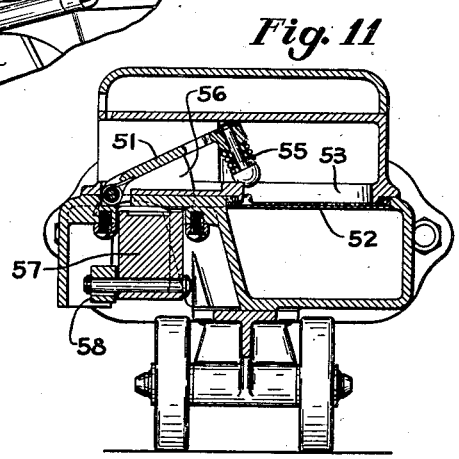
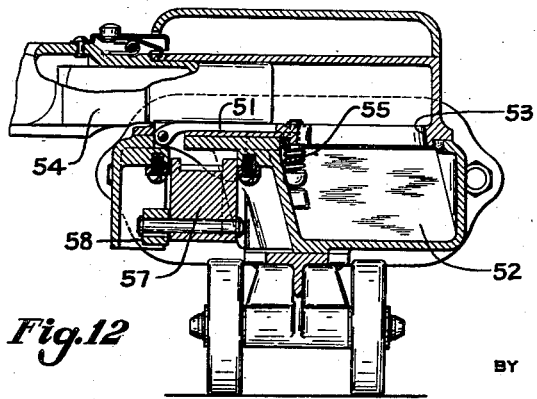
INVENTOR
William H. Kitto
BY
Harry S. Demarse
ATTORNEY Jan. 10, 1939.   W. H. KITTO   2,143,018
SUCTION CLEANER
Filed Dec. 2, 1936   6 Sheets-Sheet 5

INVENTOR
William H. Kitto
BY Harry S. Demarst
ATTORNEY

Jan. 10, 1939.  W. H. KITTO  2,143,018
SUCTION CLEANER
Filed Dec. 2, 1936  6 Sheets-Sheet 6
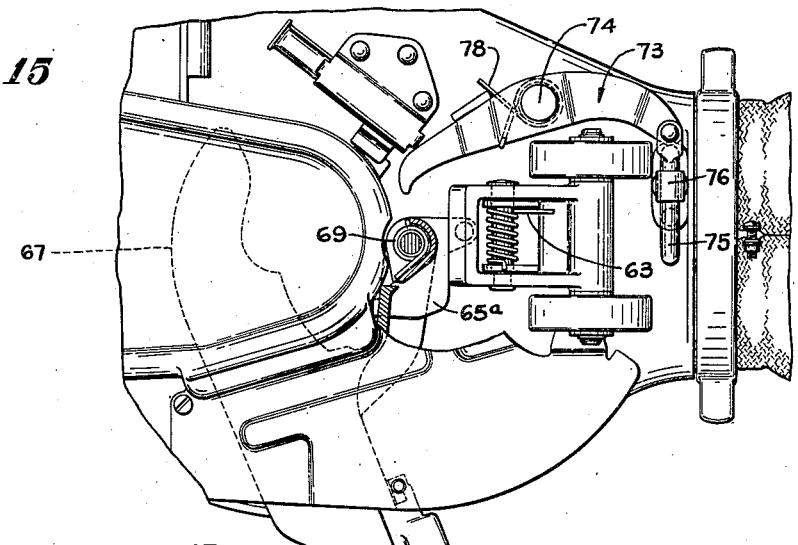
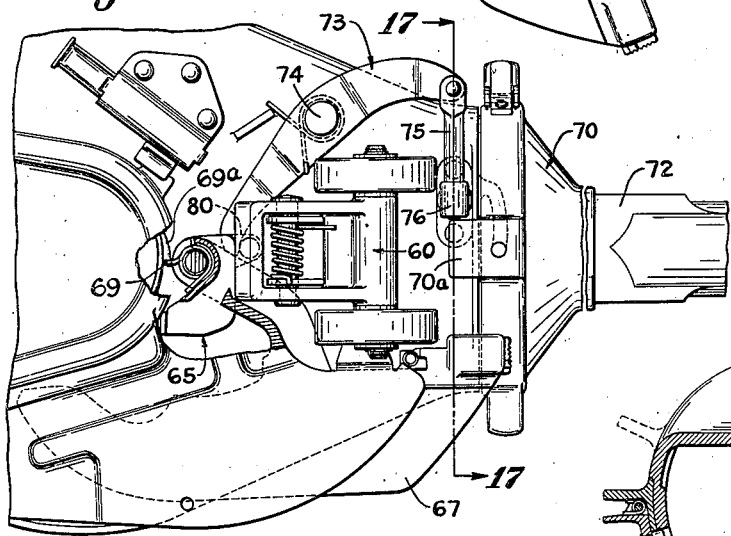
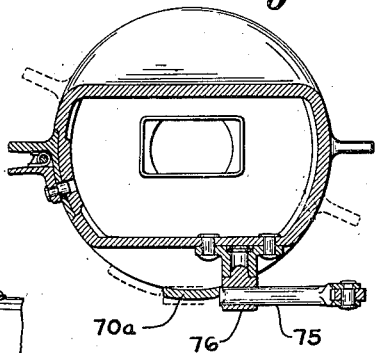
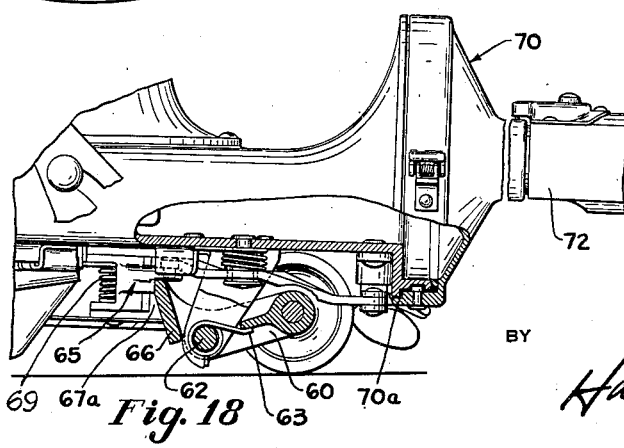
INVENTOR
*William H. Kitto*
BY
*Harry S. Dumars*
ATTORNEY Patented Jan. 10, 1939

2,143,018

UNITED STATES PATENT OFFICE 2,143,018

SUCTION CLEANER

William H. Kitto, Canton, Ohio, assignor to The Hoover Company, North Canton, Ohio, a corporation of Ohio Application December 2, 1936, Serial No. 113,784

15 Claims. (Cl. 15—9)

This invention relates to improvements in suction cleaners of the portable handle maneuvered type and more particularly to that type of suction cleaner which is convertible for cleaning other than floor coverings by means of an auxiliary hose extension and suitable cleaning tools.

The object of the invention is to provide a novel interconnecting mechanism between the so-called converting mechanism and either the front or rear supporting wheels, so that in the act of converting the cleaner to either suction or blower off-the-floor operation the main suction nozzle will be automatically raised to a somewhat greater distance above the floor than normal.

A further object of this invention is to improve upon the structure disclosed in an application for U. S. Letters Patent filed November 20, 1935 and bearing Serial No. 50,634, in which is disclosed a cleaner of the type herein contemplated, including adjustable supporting wheels for raising or lowering the nozzle, a suction converter member adapted to be swung into and out of converting position, and a separate blower converter member, as in the present disclosure, but instead of the nozzle elevating mechanism being operative during either suction or blower conversion, the nozzle raising operation was controlled entirely by the suction converter and which had to be shifted for either suction or blower operation. In the present arrangement the suction and blower converters control the nozzle elevation independently of each other as will be presently seen.

In this connection, the primary reason for elevating the nozzle above its normal operating position is due primarily to the presence of a rotary agitator in the nozzle and having surface contacting brush and/or beater elements and which, if allowed to contact the carpet surface with the cleaner in a stationary position for any considerable period of time, is likely to cause undue carpet wear. Another reason for the elevation of the nozzle is to afford a freer and less obstructed entrance for the air into nozzle, although this is of advantage only when the cleaner is being operated as a blower.

A cleaner embodying the novel features of the invention is fully disclosed in the accompanying drawings, in which:

Figure 9 is a fragmentary view in side elevation of a suction cleaner with portions of the side wall removed to show a modified arrangement for actuating the nozzle elevating mechanism by the blower converter;

Figure 10 is a fragmentary bottom plan view of cleaner shown in Figure 9, showing the nozzle elevating mechanism in its normal position;

Figure 11 is an enlarged view in vertical section taken on line 11—11 of Figure 9 showing the blower converter valves in their normal positions;

Figure 12 is a view similar in all respects to Figure 11 but showing the valves shifted by the insertion of the blower converter member;

Figure 15 is a fragmentary bottom plan view corresponding to Figure 14, but showing the nozzle elevating mechanism in nozzle raising position by the swinging of the suction converter member into converting position;

Figure 16 is another fragmentary bottom plan view corresponding to Figures 14 and 15, but showing the nozzle raising mechanism actuated by the replacement of the dirt bag with the blower attachment;

Figure 17 is a detail view in cross section taken in line 17—17 of Figure 16 and, Figure 18 is a fragmentary view in side elevation of the cleaner corresponding generally to Figure 13, but showing the nozzle raising mechanism shifted by the mounting of the blower attachment.

Figures 1, 2:
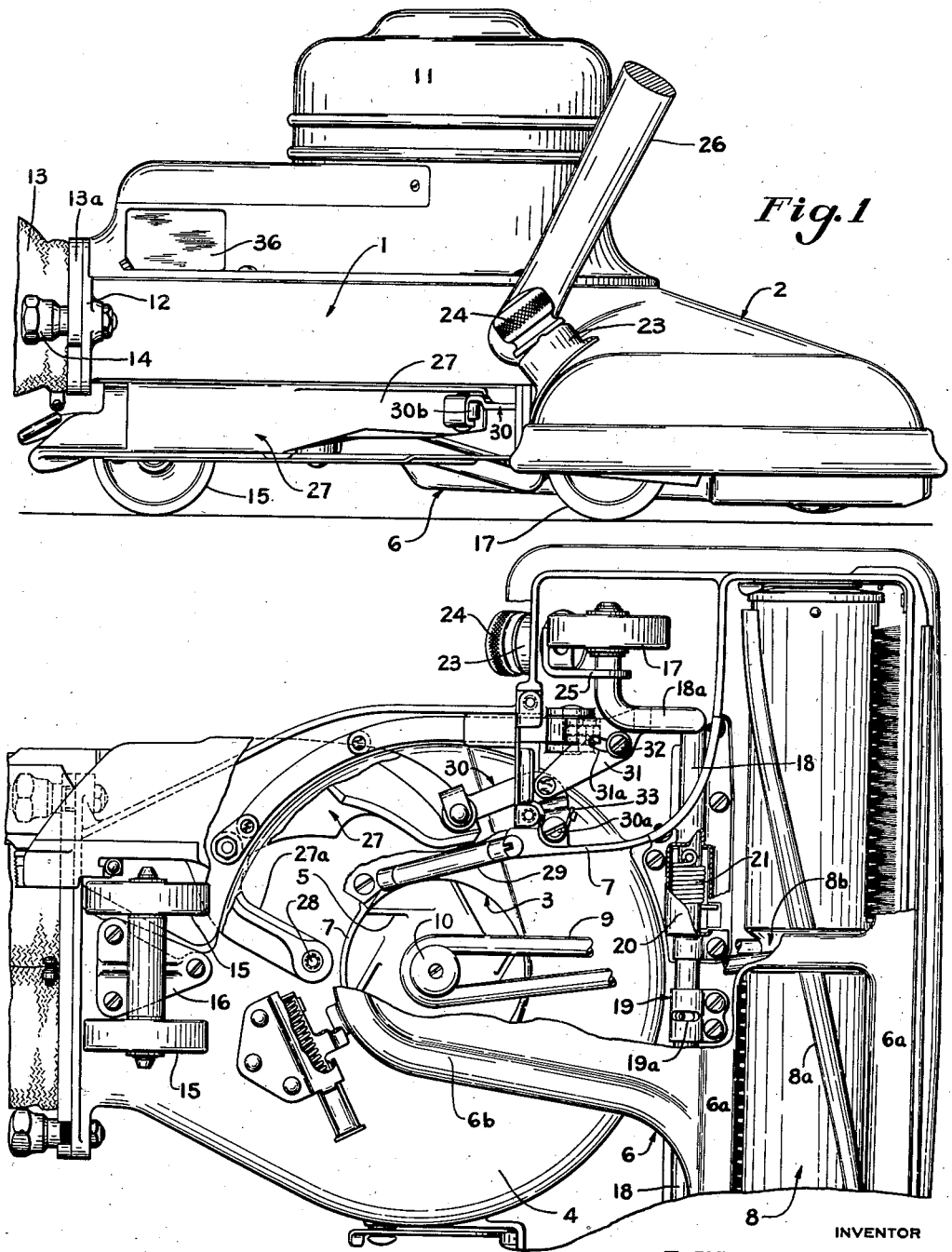
Figure 1 is a general view in side elevation of a suction cleaner with the parts adjusted for normal on-the-floor cleaning operation.
Figure 2 is a bottom plan view of the suction cleaner showing the pivoted suction converter member and the wheel elevating mechanism in non-operative positions for normal on-the-floor cleaning operation.

Referring first to the suction cleaner in its general structural features, the same comprises a wheeled casing adapted to be maneuvered over the floor by means of a pivoted handle, and comprising generally a lengthwise extended casing 1, having a nozzle portion 2 extending transversely of its forward end and projecting somewhat beyond the sides thereof. The nozzle has a downwardly facing suction mouth leading to a nozzle chamber which in turn communicates with a passage extending rearwardly beneath the main casing 1 and connected with a circular opening or eye 3, formed at the center of a substantially circular fan chamber 4, in which is mounted a fan 5. The suction mouth of the nozzle is preferably formed by a removable bottom plate 6, forming relatively wide lips 6a around the suction mouth. The bottom plate 6 also has an imperforate section 6b forming the bottom wall of a passage leading rearwardly from the nozzle chamber to the fan chamber, and included between short vertically depending wall segments 7, integral with the bottom wall of the main casing 1, and continuing forwardly and outwardly at right angles to the passage to form the rear wall of the nozzle chamber as clearly shown in Figure 2.

Mounted within the nozzle chamber and extending lengthwise just above the suction mouth is a rotary agitator 8 consisting of a cylindric body having rigid beater elements 8a on its surface and a centrally located pulley groove 8b which carries a driving belt 9, extending rearwardly through the connecting passage between the nozzle chamber and the fan chamber and having driving connection with a pulley 10 carried by the fan. The fan 5 is directly connected with a motor (not shown) enclosed within a motor casing 11 surmounting the main casing 1, said motor, fan and pulley rotating about a vertical axis and at a relatively high speed.

At the rear end of the main casing 1, is a rearwardly opening exhaust outlet 12 through which the dust laden air from the fan chamber is discharged. A dust bag 13 is connected with the exhaust outlet through means of a solid ring 13a, surrounding the mouth of the bag and detachably fitted to the outlet connection by means of clamping screws 14, 14.

The cleaner casing is supported at its rear end by a pair of wheels 15, 15, assembled as part of a caster on a bracket 16 suitably mounted on the under side of the cleaner casing and forming a support for an axle on which the rear caster wheels 15, 15 are journaled.

The forward portion of the cleaner is supported by a pair of similar wheels 17, 17 but in this case they are located in cavities formed at the outer ends of the nozzle portion of the cleaner casing and just rearwardly of the nozzle chamber. The front wheels 17, 17 are journaled at the ends of a transversely extending rock shaft 18 having its end portions bent at right angles to form the wheel supporting crank arms 18a, 18a. This shaft 18 is rotatably mounted on the under side of the bottom wall of the cleaner casing and immediately to the rear of the suction mouth by means of bearing brackets 19 and 20, the former being a plain bearing with a circumferential slot 19a formed therein and engaged by a pin projecting from the shaft 18 to prevent end play thereof. The bearing bracket 20 however, includes a housing for a torsion spring 21, surrounding the shaft and attached at one end to the shaft and suitably anchored at its other end to the casing, this spring acting to oppose the swinging of the shaft in a direction to elevate the nozzle or in other words in a counter-clockwise direction as viewed in Figure 1.

The nozzle portion to the cleaner may be raised and lowered by a manual adjusting mechanism consisting generally of an endwise shiftable stem 22 supported within a cylindric extension 23 mounted on the exterior of the nozzle portion 2, just above one of the front supporting wheels 17, and surmounted by an externally accessible knob 24. The stem 22 is connected at its lower end with the adjacent crank arm 18a of the rock shaft 18 by means of L-shaped link 25. Thus by turning the knob 24 in one direction or the other, the shaft may be rotated to depress the wheels 17 against the force exerted by the spring 21.

The handle by which the cleaner is maneuvered over the carpet surface is not shown except for a portion of its lower extremity consisting of a U-shaped bail 26, which straddles the motor and has pivotal connection with the side walls of the casing 1 just rearwardly of the nozzle portion 2, as shown in Figure 1. As is the customary arrangement, the outer or free end of the dirt bag 13 is attached to the handle adjacent its outer end, so that the bag is virtually suspended from the handle and swings with it.

The cleaner structure as thus far described would be entirely adequate for normal on-the-floor cleaning operations wherein the suction created by the fan draws the dirt laden air through the suction mouth as the cleaner is maneuvered over the carpet surface and then discharged into the dirt bag 13.

But as already intimated, the cleaner is designed and constructed for socalled off-the-floor cleaning operation. Moreover, the cleaner is designed for both off-the-floor suction and blower cleaning, the latter being used primarily to dislodge dirt that cannot be effectively reached by suction.

Considering first the means for converting the cleaner for off-the-floor suction cleaning, there is carried on the underside of the casing 1, a converter member 27, having pivotal mounting upon a pin 28, just to the rear of the fan eye 3 and consisting of a tubular section or conduit supported at the end of an arm 27a at an acute angle thereto. The converter member normally extends along the side of the casing and lengthwise thereof, with its forward portion practically concealed beneath the fan chamber and its outer extremity just beneath the exhaust outlet of the cleaner casing as shown in Figures 1 and 2. The forward end portion of the converter member 27 is shaped to form a valve adapted in converting position to extend across the passageway between the nozzle chamber and the fan chamber and to have marginal contact with the top, bottom and opposite side walls thereof to form a seal or barrier between the nozzle and the fan chamber.

Figure 3:
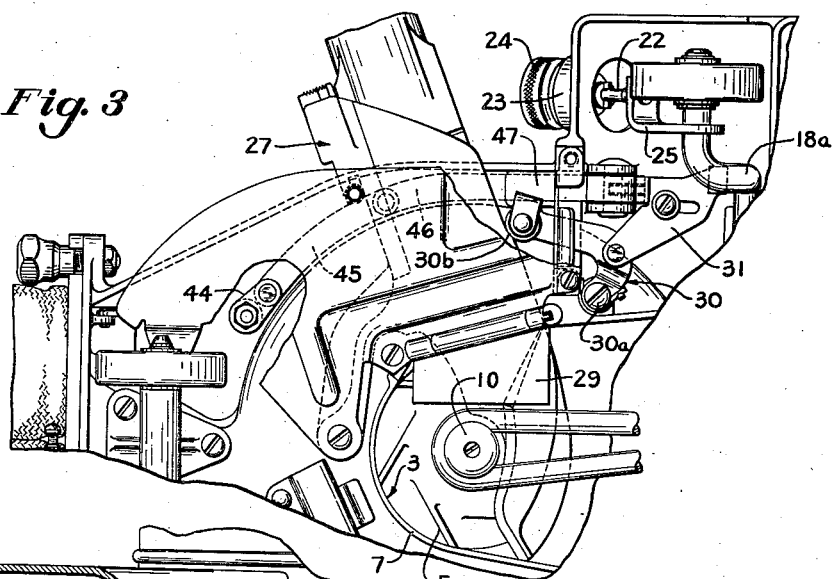
Figure 3 is a repetition of a portion of Figure 2, showing the suction converter member shifted into converting position and the front wheels in nozzle elevated position.

To shift the converter member 27 from its normal inoperative position as shown in Figure 2, to its converting position as shown in Figure 3, it is swung manually in a forward direction through an angle of about 90 degrees which carries its forward extremity through a port in the side wall 7 of the air passageway at a point immediately forward of the fan eye 3, and thence into its converting position across said passageway, with its outer end projecting outwardly at right angles from the side of the cleaner as shown in Figure 3. Incidentally, the port through which the forward end of converter member 27 enters the passageway is normally closed by a spring pressed gate member 29 which opens by contact with the forward end of the converter member and closes automatically when the converter is withdrawn.

Once the conversion has been made by swinging the converter member into its converting position, a dusting tool hose is attached to the outer end of the converter member and the cleaner is ready for off-the-floor suction cleaning operation. Suitable latching devices may be provided to hold the converter member in its converting or nonconverting position, thus preventing its undesired displacement under the vibration of the cleaner or by contact with the objects in the movement of the cleaner about the floor.

During the off-the-floor cleaning operation, the agitator 8 continues to be driven by the belt 9 and pulley 10, and as previously stated it is desirable if not necessary to elevate the nozzle sufficiently to move the agitator out of contact with the carpet in order to avoid undue wear. This of course could be done manually by manipulating the knob 24 but it is preferred not to depend on the operator to perform this function, but rather to provide for the automatic raising of the nozzle with the converting operation through an intermediate operating mechanism which comprises a converter actuated lever arm 30 pivoted at one of its ends upon a pin 30a, located just inwardly from the adjacent wheel supporting crank arm 18a and carrying a roller 30b at its end. Having pivotal connection with this curved lever arm 30, and adjacent its pivoted end is a shift bar 31, having pin and slot connection with the lower end of a post 32, depending from the under side of the cleaner casing, the slot 31a being arranged somewhat obliquely to the center line of the lever, but in a general fore and aft direction with reference to the cleaner. And finally, the forward end of the shift bar 31 terminates in a down turned end having a butting contact with the substantially upright, but slightly rearwardly inclined crank arm 18a of the rock shaft 18 as clearly shown in Figure 4. A light coil spring 33 is located at the pivoted end of the lever 30 and acts to hold the shift bar 31 in contact with the crank arm 18a.

Now, in the normal operation of the cleaner, the correct nozzle height adjustment is regulated by the manual adjusting mechanism operated through the knob 24, and once the adjustment is made, it is maintained by the spring 21 acting on the wheel shaft 18. However, when the converter member 27 is swung from its inoperative position as shown in Figure 2, into its operative or converting position as shown in Figure 3, the rounded outer edge of the converter member contacts the roller end of the lever 30 swinging it in outward direction and in turn imparting an endwise shifting movement to the bar 31 in a forward direction thereby rocking the crank arms 18a forwardly and into a substantially vertical position. This bodily movement of the wheels 17 raises the nozzle and lifts the agitator out of contact with the carpet surface.

Needless to say upon swinging the converter into its inoperative position at a completion of the off-the-floor cleaning operation, the wheel elevating mechanism resumes its normal position and the nozzle is lowered to the height determined by the adjusting knob 24.

Now, to convert the cleaner for blower operation, the procedure is to divert the exhaust from the outlet to the dirt bag to a separate outlet connection, although as will appear from a later application, a practical blower conversion can be accomplished by merely removing the dirt bag and replacing it with a hose attaching fitting. In any case, one desirable arrangement for blower conversion is disclosed in Figures 1 to 8, wherein is provided a blower conduit 35, entering from one side of the cleaner casing and extending transversely thereof just above the top wall 1a of the cleaner casing 1 and just forwardly of the outlet connection 12. The entrance to this blower conduit is normally closed by a hinged gate valve member 36 supported on a vertical stem 37 journalled at one side of the entrance to the blower conduit and having an end portion projecting downwardly through the top wall 1a of the main casing and into the space below.

Figure 4:
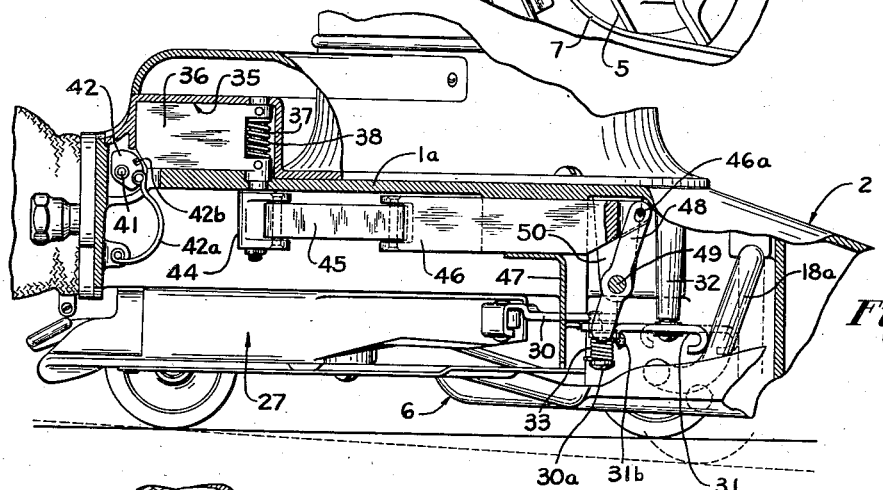
Figure 4 is a fragmentary view in side elevation similar to Figure 1, but with portions of the side wall of the casing removed to show the complete nozzle elevating mechanism.
Figure 5:
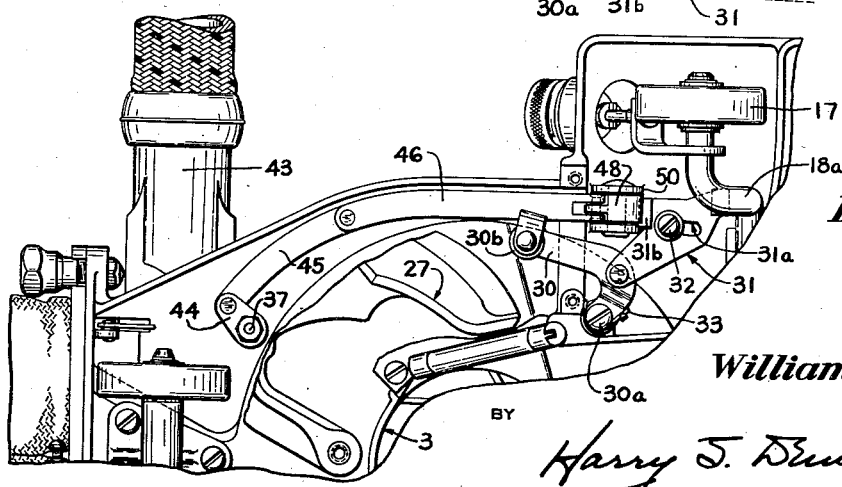
Figure 5 is a fragmentary bottom plan view corresponding to Figure 3, but showing the suction converter member in its non-operative position, the blower converter attached and the front wheels shifted to nozzle raising position.
Figure 6:
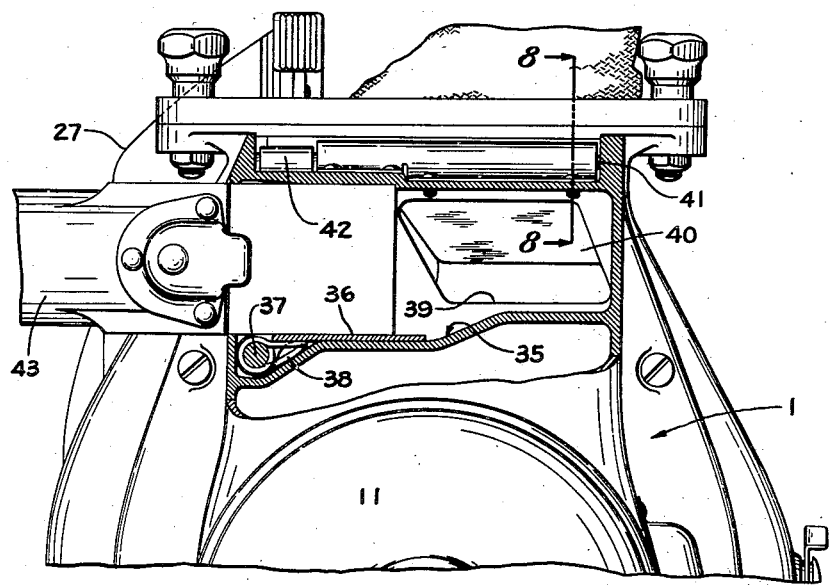
Figure 6 is a fragmentary top plan view in enlarged detail with the top wall of the cleaner casing removed just above the blower converter port and showing the converter inserted.
Figures 7, 8:
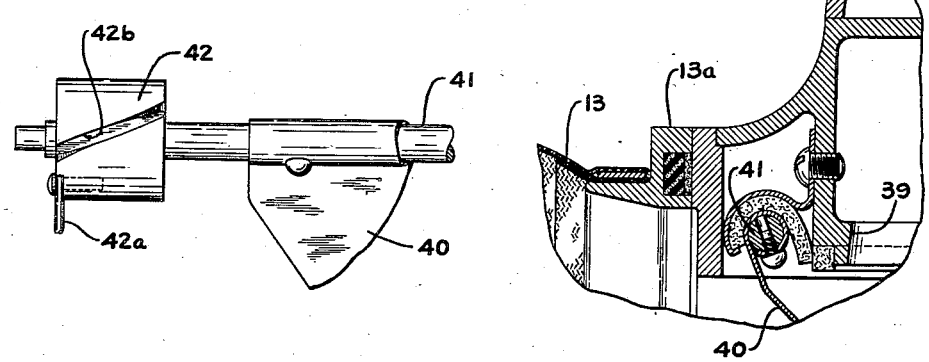
Figure 7 is an enlarged detail view of the blower converter valve assembly removed and showing particularly the valve supporting rod and the spring actuated cam member which automatically closes the valves when the converter is inserted.
Figure 8 is an enlarged detail view in vertical section taken on line 8—8 of Figure 6 and showing the mounting for the blower converter valve.

A torsion spring 38 normally holds the gate valve 36 in its closed position crosswise of the entrance to the blower conduit as clearly shown in Figure 4. At the inner end of the blower conduit and formed in the top wall 1a of the casing is a port 39 which connects the blower conduit with the exhaust outlet from the fan chamber immediately below. This port is normally closed by means of a hinged gate or valve member 40 carried by a shaft 41 extending transversely of the cleaner casing along the rear edge of the blower conduit as shown in Figures 6 and 8. Also carried by the valve shaft 41 and located at the entrance end of the blower conduit is a semi-cylindric shaped cam member 42 and a loop spring 42a acting thereon to hold the valve member 40 in closed position over the port 39 so that the blower conduit is closed off from the exhaust passage beneath when the cleaner is arranged for suction cleaning operation.

To complete the conversion for blower operation a converter fitting 43 fixed to the end of the dusting tool hose and shaped to conform to the rectangular sectional contour of the blower conduit is inserted by hand into the entrance of the blower conduit, the gate member 36 being swung back against the end wall of the conduit as shown in Figure 6, while a projection along the lower corner edge of the converter fitting enters edgewise into a diagonal cam groove 42b in the cam 42, thereby rotating the shaft 41 carrying the gate valve 40 in a downward direction to simultaneously open the port 39, and close off the exhaust passage leading from the fan chamber to the outlet connection to the dust bag, thus diverting the air stream directly to the blower attachment.

It may be stated at this point that the general arrangement of the blower converter shown herein follows that of the disclosure referred to at the outset of the specification, but departs therefrom in the means employed for raising the nozzle above the floor during blower operation.

Accordingly, attention is now directed to the vertical shaft 37, carrying the gate member 36 and projecting below the top wall 1a of casing 1. On the lower end of this shaft is fixed a crank arm 44 to which is connected a link 45, extending in a forward direction and having a slight curvature to conform to that of the adjacent side wall of the cleaner casing 1. Pivotally connected to the forward end of the curved link 45 is a somewhat longer and relatively straight link 46, slidable endwise upon a suitable supporting bracket 47, and provided at its forward end with a forked end bearing a transverse pin 46a. Immediately below the forward end of the longer link 46 is a vertically arranged lever 48, pivoted substantially intermediate its ends on a transverse bearing pin 49 supported at the lower end of a bracket 50 depending from the top wall of the cleaner casing 1. The lower end of the lever 48 terminates in a rounded extremity adapted to bear against the edge of the shift bar 31, which has a rounded abutment 31b just beyond the rear end of the slot 31a, and substantially in line therewith.

Referring now to Figures 2 and 4, the normal position of the parts of the blower converter actuated nozzle elevating mechanism corresponds to the closed position of the gate valve 36 at the entrance to the blower conduit, in which the shift bar contacting arm of the lever 48 is retracted in a rearwardly direction so that said shift bar 31 is free to be operated through the movement of the suction converter member 27 and its intermediate operating lever 30. However, upon the insertion of the converter fitting 43 and with the suction converter member 27 in its inoperative position, the gate member 36 opening through an angle of 90 degrees swings the crank arm 44 through the same angle in a counter-clockwise direction from the position in Figure 2 to that in Figure 5, this movement shifting the bar 46 rearwardly and transmitting, through the intermediate lever 48, a corresponding forward movement to the shift bar 31.

Thus it is seen that the shift bar 31 has operative connection with both the suction and blower converting mechanisms, with the result that the nozzle will be raised with either converting operation and through a single operating member adapted to be actuated by both the suction and blower converter, but with the operation by one being quite independent of the operation by the other, so regardless of whether the cleaner is being operated for off-the-floor suction or blowing operation, the elevation of the nozzle to lift the agitator out of contact with the carpet surface, is automatically taken care of.

Referring now to Figures 9 to 12 inclusive, a slightly modified arrangement of the blower converter actuated nozzle raising mechanism is shown, although the results accomplished are quite the same as previously described. In fact, the location of the blower converter is the same and the conversion operation is accomplished in the same manner. However, instead of the gate valve at the entrance to the blower conduit turning about a vertical axis, the modified gate valve member 51 swings on a horizontal axis crosswise of the entrance to the blower conduit and extends inwardly in an upwardly inclined direction. In the second place, the valve 53 between the blower conduit and the exhaust passage is merely hinged along one edge of the connecting port 52, and upon the insertion of the converter fitting 54, the gate valve 51 is depressed into contact with the bottom of the conduit and a spring pressed plunger 55 carried at the end thereof contacts the port valve member 52 and not only throws it downwardly into converting position, but holds it in that position as long as the blower converter is seated in the conduit.

The gate member 51 is also provided along one edge with a downwardly projecting cam member 56, which passes through a slot in the top wall 1a of the casing 1 and has bearing engagement along its curvilinear bottom edge with a spring pressed rocker arm 57 pivotally mounted in the cavity beneath the blower conduit and to one side of the exhaust passage from the fan chamber. A link 58 is connected at one end to the rocker arm 57 and extending forwardly to a point immediately above the shift bar 31 carries a downwardly projecting pin 59 adapted to contact the abutment 31b on the bar, so that in effecting the blower conversion the raising of the nozzle automatically follows. The action of this modified arrangement is so similar to that previously described that further discussion is unnecessary.

Referring now to another modified arrangement (Figures 13 to 18, inclusive), the raising of the nozzle accompanies either suction or blower conversion, but in this case the mechanism acts through the rear wheels rather than the front wheels and, as a further departure, the cleaner casing is not provided with a separate blower conduit but instead, the dirt bag is replaced by a special blower converter member which functions to tilt the casing through an adjustable rear caster assembly. This caster assembly comprises a bracket 60 carrying the rear wheels and pivotally supported between a pair of spaced posts 61, 61 depending from the bottom wall of the casing and supporting a transverse pin 62 on which the caster bracket 60 pivots. A torsion spring 63 surrounds the pin and acts on the caster bracket 60 to hold the same in its raised position as shown in Figure 18.

Pivotally mounted on a bearing pin 64, depending from the underside of the casing 1 just forwardly of the rear caster assembly, is a flat rectangular-shaped cam 65 having a portion 65a projecting in a general rearward direction and adapted to contact the slightly inclined face of a vertically arranged abutment plate 66 formed integral with the caster bracket 60 and acting as a lever arm projecting upwardly from the pivotal axis of the bracket.

Figure 13:
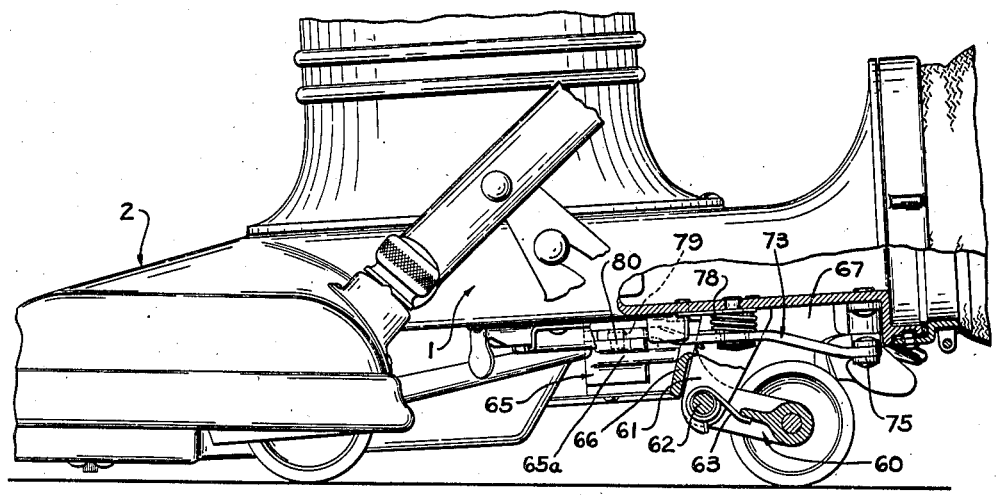
Figure 13 is a view in side elevation of a suction cleaner showing a further modified arrangement for a combined suction and blower converter actuated nozzle elevating mechanism functioning through the rear carrier wheels and the utilizing a blower attachment to replace the dirt bag.

As thus arranged, the rear caster assembly is normally held in its depressed or lowered position, as shown in Figure 13, by the cam member 65 bearing against the abutment plate 66 and holding the bracket against swinging movement in a counterclockwise direction under the tension of the torsion spring 63. However, this cam member 65 may be actuated to release the caster bracket 60, and ultimately effect the raising of the nozzle, by the swinging movement of the suction converter member 67, which is similar in all respects to the one shown in the earlier disclosure herein including an arm 67a journalled on the same bearing pin 64 that supports the cam member 65. But in this instance the extremity of the supporting arm 67a is bifurcated so that it straddles the bearing portion of the cam member 65 and a stop member 68 on the cam member 65 overlies the outer edge of the arm 67a, so that in the swinging movement of the converter member into its converting position, the cam member 65 swings with it and against the tension of a torsion spring 69 (Figure 15) which normally acts on the cam member to oppose its rotation or movement in a clockwise direction with the converter member as it swings from its inoperative position as shown in Figure 14, to its operative or converting position as shown in Figure 15.

Thus it is the swinging or rotation of the cam member through an angle of substantially 90 degrees that carries it out of contact with the abutment plate 66 of the caster bracket 60, thus allowing the same to be raised or retracted under the tension of the torsion spring 62, to effect the lowering of the rear end and the raising of the nozzle at the forward end of the casing.

Figure 14:
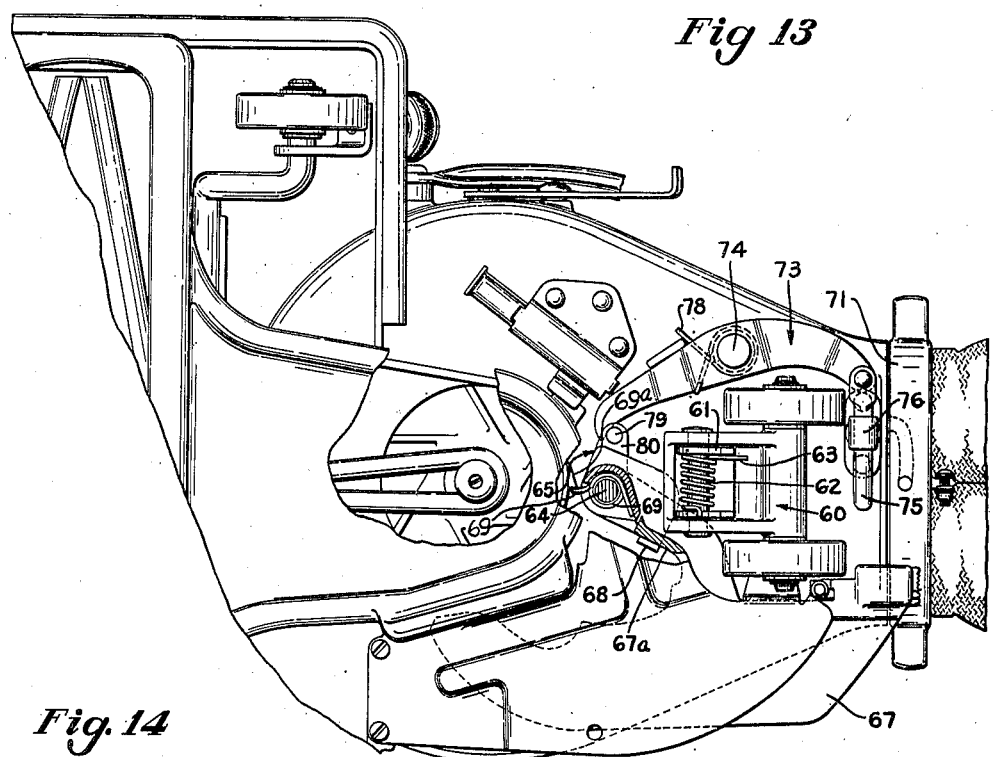
Figure 14 is a fragmentary bottom plan view of the converter actuated nozzle height adjusting mechanism in nonoperative position.

The blower converter fitting consists of a funnel shaped member 70 having a flat rim about its open end which is for the most part a counterpart of the ring 71 whereby the dirt bag is detachably connected to the exhaust outlet of the cleaner as shown in Figures 14 and 15. This converter fitting 70 is carried at the end of the hose 72 and is attached to the exhaust outlet connection of the cleaner by a simple form of bayonet joint consisting of short projections on the flanged edge of the outlet engaging annularly arranged slots in the rim of the blower converter member, the joint being made by rotating the parts through a small angle. A lug 70a formed integral with the blower converter fitting 70 projects outwardly beyond the edge of rim thereof and in applying the fitting, this lug is positioned at the bottom thereof, as shown in Figure 16.

Mounted on the underside of the casing is a shift lever 73 of a somewhat crescent shape pivoted intermediate its end on a bearing pin 74 anchored in the bottom wall of cleaner casing just beyond the rear caster assembly and on the side opposite the suction converter member 67. This lever 73 extends in a general forward and rearward direction beneath the casing. A pin 75 has pivotal connection with the rearmost end of the shift lever and, extending substantially at right angles thereto, is slidably mounted in a bearing sleeve 76 mounted just forwardly of the flanged outlet connection from the exhaust passage and offset slightly to one side of the longitudinal center line of the casing, as clearly shown in Figure 17. The end portion of the pin 75 projects beyond its bearing, being held in place by a torsion spring 78 acting upon the lever at its fulcrum to swing the same in a clockwise direction as shown in Figures 14 and 15. The opposite or forward end of the lever 73 has a slightly hooked extremity adapted in the normal position of the lever to contact a pin 79 projecting upwardly from the end of a lever arm 80 integral with the cam 65.

The action of the lever 73 in raising or lowering the hinged rear caster bracket with the attachment or removal of the fitting 70 will be clearly seen by comparing Figures 14 and 16. Having removed the dirt bag from the exhaust outlet the same is replaced by the blower fitting 70 with its bayonet lock connection which necessitates the partial rotation of the fitting as already mentioned. Thus, with the partial rotation of the blower fitting 70 in a counter-clockwise direction as shown in Figure 17, the lug 70a forces the pin 75 outwardly and endwise thereby rocking the lever 73, which in turn swings the cam member 65 out of contact with the abutment plate 66 of the hinged caster bracket 60, thus allowing the rear end portion of the casing to be lowered by gravity and against the tension of the torsion spring 62 to bring about a corresponding elevation of the nozzle. In this connection, it is to be noted that the torsion spring 69, with one bearing against the cam 65 and its other end against a lug 69a formed integral with the adjacent portion of the main casing 1, is strong enough to overcome the weight normally supported by the rear caster 60 as well as the opposing tension of the torsion spring 62 and swing the cam member 65 in a counter-clockwise direction into contact with the abutment plate 66 of the rear caster bracket 60 immediately upon the swinging of the suction converter member into its inoperative position or the removal of the blower converter member, this spring actuation of the cam member 65 thereby depressing the rear caster bracket and raising the rear portion of the cleaner body to restore the nozzle to its proper height.

Thus it will be seen that the attachment and removal of the blower converter fitting raises and lowers the nozzle in the same way as does the swinging of the suction converter member 67, inasmuch as the cam member 65 is arranged to be actuated either by the suction or blower converter member to raise and lower the nozzle.

Thus to summarize the three types of converter actuated nozzle elevating devices disclosed, all have one common feature, namely, a primary actuating member which is shiftable to raise and lower the nozzle portion and an independently functioning mechanism having operative connection with the suction and blower converter members for actuating the primary nozzle elevating member. Obviously, other arrangements may be devised for accomplishing the same result, therefore the invention is not limited to the disclosures herein.

I claim as my invention:

1. In a suction cleaner, the combination of a casing having a nozzle, suction creating means normally connected with said nozzle through an inlet passage and having an outlet passage, adjustable means for raising and lowering the nozzle portion of said casing relative to the floor surface, converter means adapted to be positioned to communicate with either of said inlet and outlet passages for converting the cleaner to suction or blower operation, and means operative in the positioning of said converting means in either converting position to actuate said adjustable means and raise said nozzle.

2. In a suction cleaner, the combination of a casing having a nozzle, a suction creating means normally connected with said nozzle through an inlet passage and having an outlet passage, adjustable means for raising and lowering the nozzle portion of said casing relative to the floor surface, converter means adapted to be positioned to form secondary passages communicating with said inlet and said outlet passage respectively, and means operative in the act of positioning said converter means to actuate said adjustable means and raise said nozzle.

3. In a suction cleaner, the combination of a casing having a nozzle, suction creating means provided with an air inlet passage normally connected with said nozzle and having an air outlet passage, adjustable means for raising and lowering the nozzle relative to the floor surface, said inlet and outlet passages being provided with ports either of which is adapted to receive converting means, and converter actuated means operatively connected with said adjustable nozzle raising and lowering means to raise the nozzle in the application of the converting means to either of said ports.

4. In a suction cleaner, the combination of a casing including suction creating means, an air inlet passage leading to and an exhaust passage leading from said suction creating means, adjustable means for raising and lowering the entrance to said air inlet passage relative to the floor level, converter means adapted to be applied at said inlet passage or exhaust passage to form a secondary passage either to or from said suction creating means, and means operatively connected with said adjustable raising and lowering means and comprising converter actuated members shiftable to effect the raising of the entrance to said inlet passage with the application of either converting means.

5. In a suction cleaner, the combination of a casing having a nozzle, suction creating means having an air inlet from said nozzle and an exhaust outlet, converting means operative to convert either said air inlet or said exhaust outlet into an auxiliary suction inlet or blower outlet respectively, adjustable means for raising the nozzle portion of said casing, and means actuated by said converting means to operate said adjustable nozzle raising and lowering means during either auxiliary suction or blower cleaning operation.

6. In a suction cleaner, the combination of a casing having suction-creating means, and an air inlet and an exhaust outlet leading to and from said suction-creating means respectively, converting means operative to close off said air inlet or said exhaust outlet and to form an auxiliary air inlet to or outlet from said suction-creating means, adjustable means for raising the air inlet a predetermined distance above the floor level and means actuated by said converting means to automatically raise said casing during either auxiliary inlet or outlet cleaner operation.

7. In a suction cleaner, the combination of a casing having a nozzle, suction creating means having an air inlet passage from said nozzle and an air outlet, a suction converter member operative to close off said inlet and to create a secondary air inlet, a blower converter member adapted to be applied at said outlet, adjustable means for raising the nozzle, and mechanism operatively connected with said adjustable nozzle raising means and actuated independently by said converter members in the act of converting the cleaner to suction or blower operation to raise said nozzle above its normal operating height.

8. In a suction cleaner, the combination of a casing having suction-creating means, a nozzle having a passage leading to said suction creating means and an exhaust outlet leading therefrom, a converter member operative to close off said inlet passage and to create a secondary air inlet passage, a tubular extension adapted to be connected with said exhaust outlet, means for raising the nozzle portion of said casing, and mechanism operatively connected with said nozzle elevating means and comprising members located in positions to be actuated by said converter member and tubular extension to raise said nozzle during suction or blower converter operation.

9. In a suction cleaner, the combination of a casing including suction-creating means, a nozzle communicating with said suction-creating means, and an exhaust outlet leading from said suction-creating means, casing supporting members adjustable to raise and lower the nozzle portion of said casing, a suction converter adapted to be shifted into a position to close off the communication between said nozzle and said suction producing means and to create a secondary inlet passage, a hose fitting adapted to be applied at said exhaust outlet to divert air under pressure therethrough and mechanism operatively connected with said nozzle elevating means and comprising independently functioning suction and blower converter actuated members shiftable thereby in their movement into converting operation to raise said nozzle.

10. In a suction cleaner, the combination of a casing including suction creating means and a nozzle communicating therewith through an inlet passage, a wheeled support mounted beneath said casing and adjustable vertically to raise and lower said nozzle, a suction converter member adapted to be positioned to close off said inlet passage and to provide an auxiliary passage to said suction creating means, said casing having an exhaust passage and a port communicating with said exhaust passage, a blower converter member adapted to seat in said port and to divert the passage of the air through said blower converter member, and converter actuated mechanism comprising members connected independently with said nozzle adjusting means and operative to elevate the nozzle in the act of converting the cleaner to suction or blower operation.

11. In a suction cleaner, the combination of a casing having a nozzle portion, suction creating means communicating with said nozzle through an air passage having a port, supporting wheels for said casing including a supporting member adjustable vertically thereto to raise and lower said nozzle, said casing having an exhaust passage with a port communicating therewith, converter member adapted to be inserted into one or the other of said ports to form auxiliary inlet and exhaust passages to and from said suction creating means, and converter actuated means operatively connected with said adjustable wheel supporting member and functioning independently of each other to raise said nozzle during either suction or blowing operation.

12. In a suction cleaner adapted to be converted to and from off-the-floor cleaning operation, the combination of a casing having a nozzle, suction creating means communicating with said nozzle through an air passage having a port opening thereinto, a converter member adapted to seat in said port to form an auxiliary air inlet passage to said suction creating means, said casing having an air exhaust passage leading from said suction creating means and a port communicating with said exhaust passage and adapted to have a converter member seated therein to divert the air from said exhaust passage and through said port, a vertically adjustable wheeled support for said casing and a pair of shiftable members operatively and independently connected with said adjustable support and positioned to be actuated by the seating of a converter member into either said suction or blower port to raise said nozzle above the floor.

13. In a suction cleaner adapted to be converted to and from off-the-floor suction or blower operation, the combination of a casing having a nozzle, suction creating means having an air inlet passage from said nozzle and an air outlet passage, a converter member adapted to seat in a port opening into said air inlet passage to provide an auxiliary inlet to said suction creating means, said casing having a port communicating with said outlet passage and adapted to have a converter member seated therein to divert the air from said suction creating means therethrough, an adjustable support for said casing comprising a rock shaft having wheels journalled thereon, and a pair of shift levers having independent operative connection with said rock shaft and adapted to be actuated by the insertion of a converter member into either of said ports to rock said wheel supporting shaft and thereby raise the nozzle preparatory to either suction or blower operation.

14. In a suction cleaner adapted to be converted to and from off-the-floor cleaning operation, the combination of a casing including suction-creating means, a nozzle having an air inlet passage leading to said suction-creating means and an exhaust outlet passage leading from said suction-creating means, a suction converter member pivotally mounted on said casing exterior said air inlet passage to said suction-creating means and adapted to be swung bodily into a position to close off said inlet passage and to provide a secondary inlet passage to said suction-creating means, a blower converter member adapted to be inserted into a conduit formed in said casing and to communicate with said exhaust outlet passage during blower operation, a valve member normally closing off said conduit and mounted to swing open with the insertion of said blower converter member, adjustable supporting means comprising connected crank arms pivotally mounted on said casing and wheels journalled at the ends of said crank arms, a shift bar slidably mounted on said casing and adapted to have contact with one of said crank arms, a lever operatively connected with said shift bar with its free end positioned in the path of movement of said suction converter member into converting position, and a lever operatively connected with said blower converter actuated valve member and adapted to actuate said shift bar whereby said nozzle is raised in the conversion of said cleaner to either suction or blower off-the-floor operation.

15. In a suction cleaner adapted to be converted to and from off-the-floor cleaning operation, the combination of a casing including suction-creating means, a nozzle having an air inlet passage leading to said suction-creating means and an exhaust outlet passage leading from said suction-creating means, a suction converter member pivotally mounted on said casing exterior said air inlet passage to said suction-creating means and adapted to be swung bodily into a position to close off said inlet passage and to provide a secondary suction inlet passage, a blower converter member adapted to be inserted into a conduit formed in said casing and to communicate with said exhaust outlet passage during blower operation, a gate valve normally closing the entrance to said conduit and adapted to swing open to admit said blower converter member, adjustable casing supporting means comprising a horizontal shaft extending transversely of said casing and provided at its ends with crank arms and wheels journalled at the ends of said crank arm, a shift bar slidably mounted on said casing and adapted to have contact with one of said crank arms, a lever having pin and slot connection with said shift bar and provided with a cam roller positioned in the path of swinging movement of said suction converter member into converting position, a second lever adapted to have operative contact with said shift bar and a linkage connecting said last mentioned lever and adapted to actuate said shift bar upon the insertion of said blower with said gate valve, whereby said bar is shifted to raise said nozzle in the conversion of said cleaner to either suction or blower off-the-floor operation.

WILLIAM H. KITTO.